US011888501B2

(12) United States Patent
Lo et al.

(10) Patent No.: US 11,888,501 B2
(45) Date of Patent: Jan. 30, 2024

(54) TOTAL RADIATED POWER MEASUREMENTS OF IN-BAND CHANNEL FREQUENCIES BASED ON BEAM DIRECTIVITY

(71) Applicant: Nokia Technologies Oy, Espoo (FI)

(72) Inventors: Anthony Lo, Bristol (GB); Matthew Baker, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/635,201

(22) PCT Filed: Aug. 6, 2020

(86) PCT No.: PCT/EP2020/072094
§ 371 (c)(1),
(2) Date: Feb. 14, 2022

(87) PCT Pub. No.: WO2021/028301
PCT Pub. Date: Feb. 18, 2021

(65) Prior Publication Data
US 2022/0294541 A1  Sep. 15, 2022

Related U.S. Application Data

(60) Provisional application No. 62/887,199, filed on Aug. 15, 2019.

(51) Int. Cl.
*H04W 88/08* (2009.01)
*H04B 17/10* (2015.01)

(52) U.S. Cl.
CPC ........... *H04B 17/102* (2015.01); *H04W 88/08* (2013.01)

(58) Field of Classification Search
CPC ............................. H04B 17/102; H04W 88/08
See application file for complete search history.

(56) References Cited

U.S. PATENT DOCUMENTS

| 6,289,290 | B1 * | 9/2001 | Lee .................... G01R 29/0814 |
| | | | 702/57 |
| 10,153,549 | B2 * | 12/2018 | Robinson ................. H01Q 3/24 |
| 11,456,806 | B2 * | 9/2022 | Haustein .............. H04B 17/104 |

(Continued)

OTHER PUBLICATIONS

ETSI TS 138 141-2 V15.2.0 (Jul. 2019), "5G; NR; Base Station (BS) conformance testing Part 2: Radiated conformance testing (3GPP TS 38.141-2 version 15.2.0 Release 15)", Annex F and I, 10 pgs.

(Continued)

*Primary Examiner* — Hai V Nguyen
(74) *Attorney, Agent, or Firm* — Harrington & Smith

(57) ABSTRACT

A determination is made, for a base station that transmits on an operating frequency, whether a radiation pattern of each of one or more neighboring frequencies is correlated with a radiation pattern of the operating frequency. In response to a determination that the radiation pattern of each of the one or more neighboring frequencies is correlated with that of the operating frequency, a computation is made of a total radiated power estimate of each of the one or more neighboring frequencies by performing a beam-based directions (Continued)

procedure for the base station. The total radiated power estimates of each of the one or more neighboring frequencies are output.

19 Claims, 7 Drawing Sheets

(56) References Cited

U.S. PATENT DOCUMENTS

| | | | |
|---|---|---|---|
| 2006/0199604 A1* | 9/2006 | Walton | H04W 52/42 455/522 |
| 2014/0064264 A1* | 3/2014 | Morita | H04W 56/00 370/350 |
| 2016/0131754 A1* | 5/2016 | Cornic | G01S 3/74 342/156 |

OTHER PUBLICATIONS

Newell, A.C. et al., "Antenna Pattern Comparison Using Pattern Subtraction and Statistical Analysis", EuCAP 2011—Covened Papers, 4 pgs.

3GPP TSG-RAN WG4 Meeting #90, Athens, Greece, Feb. 25-Mar. 1, 2019, R4-1901552, "On the beam-based direction method for TRP calculations", Nokia, Nokia Shanghai Bell, 3 pgs.

3GPP TSG-RAN4 Meeting #90, Athens, Greece, Feb. 25-Mar. 1, 2018, R4-1902272, "Way forward on TRP measurements", NTT DoCoMo, Nokia, Nokia Shanghai Bell, ZTE, 3 pgs.

"$3^{rd}$ Generation Partnership Project; Technical specification Group Radio Access Network NR Base Station (BS) conformance testing Part 2: Radiated conformance testing (Release 15)", 3GPP TS 38.141-2 V 15.2.0, Jun. 2019, 287 pgs.

"$3^{rd}$ Generation Partnership Project; technical Specification Group Radio Access Network; Active Antenna System (AAS) Base Station (BS) conformance testing (Release 15)", 3GPP TS 37.145-2 V 15.4.0, Jun. 2019, 339 pgs.

Kraus, J.D., Antennas, McGraw-Hill, 1989, pp. 22-26.

Balanis, C.A., Antenna Theory: Analysis and Design, Fourth edition, Wiley, 2016, pp. 50-52.

Orfanidis, S.J., Electromagnetic Waves and Antennas, 2016, pp. 1106-1110.

Orfanidis, Sophocles J., "Electromagnetic Waves and Antennas", material from http://eceweb1.rutgers.edu/-~orfanidi/ewa/, downloaded on Aug. 14, 2019, 12 pgs.

* cited by examiner

TOTAL RADIATED POWER MEASUREMENTS OF IN-BAND CHANNEL FREQUENCIES BASED ON BEAM DIRECTIVITY

CROSS REFERENCE TO RELATED APPLICATION

This patent application is a U.S. National Stage application of International Patent Application Number PCT/EP2020/072094 filed Aug. 6, 2020, which is hereby incorporated by reference in its entirety, and claims priority to U.S. provisional application 62/887,199 filed Aug. 15, 2019, which is hereby incorporated by reference in its entirety.

TECHNICAL FIELD

This invention relates generally to wireless (e.g., cellular) base stations and, more specifically, relates to power measurements on cellular base stations.

BACKGROUND

A cellular base station is one type of wireless base station engineered to radiate power within the bandwidth of its assigned channel frequency. The assigned channel frequency is also known as the operating, carrier, or wanted frequency. Due to, e.g., non-linear effects of Radio-Frequency (RF) components such as power amplifiers, the base station also emits power outside its channel bandwidth in neighboring frequencies, which causes interference to other base stations operating in these neighboring frequencies. The unintended power in the neighboring frequencies is also known as unwanted emissions, which are classified into in-band and spurious emissions. It would be beneficial to quantify these unwanted emissions.

BRIEF SUMMARY

This section is intended to include examples and is not intended to be limiting.

In an exemplary embodiment, a method is disclosed that includes determining, for a base station that transmits on an operating frequency, whether a radiation pattern of each of one or more in-band neighboring frequencies is correlated with a radiation pattern of the operating frequency. The method includes computing, in response to a determination that the radiation pattern of each of the one or more in-band neighboring frequencies is correlated with that of the operating frequency, a total radiated power estimate of each of the one or more in-band neighboring frequencies by performing a beam-based directions procedure for the base station, and outputting the total radiated power estimates of each of the one or more in-band neighboring frequencies.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus to perform operations comprising: determining, for a base station that transmits on an operating frequency, whether a radiation pattern of each of one or more in-band neighboring frequencies is correlated with a radiation pattern of the operating frequency; and computing, in response to a determination that the radiation pattern of each of the one or more in-band neighboring frequencies is correlated with that of the operating frequency, a total radiated power estimate of each of the one or more in-band neighboring frequencies by performing a beam-based directions procedure for the base station, and outputting the total radiated power estimates of each of the one or more in-band neighboring frequencies.

An exemplary computer program product includes a computer-readable storage medium bearing computer program code embodied therein for use with a computer. The computer program code includes: code for determining, for a base station that transmits on an operating frequency, whether a radiation pattern of each of one or more in-band neighboring frequencies is correlated with a radiation pattern of the operating frequency; and code for computing, in response to a determination that the radiation pattern of each of the one or more in-band neighboring frequencies is correlated with that of the operating frequency, a total radiated power estimate of each of the one or more in-band neighboring frequencies by performing a beam-based directions procedure for the base station, and outputting the total radiated power estimates of each of the one or more in-band neighboring frequencies.

In another exemplary embodiment, an apparatus comprises means for performing: determining, for a base station that transmits on an operating frequency, whether a radiation pattern of each of one or more in-band neighboring frequencies is correlated with a radiation pattern of the operating frequency; and computing, in response to a determination that the radiation pattern of each of the one or more in-band neighboring frequencies is correlated with that of the operating frequency, a total radiated power estimate of each of the one or more in-band neighboring frequencies by performing a beam-based directions procedure for the base station, and outputting the total radiated power estimates of each of the one or more in-band neighboring frequencies.

BRIEF DESCRIPTION OF THE DRAWINGS

In the Attached Drawing Figures:

FIG. 3 illustrates power radiation patterns of operating and in-band neighboring frequencies, and is split into the following figures.

FIG. 4 illustrates correlation of the radiation patterns shown in FIG. 3, and is split into the following figures.

DETAILED DESCRIPTION OF THE DRAWINGS

Figure 1:
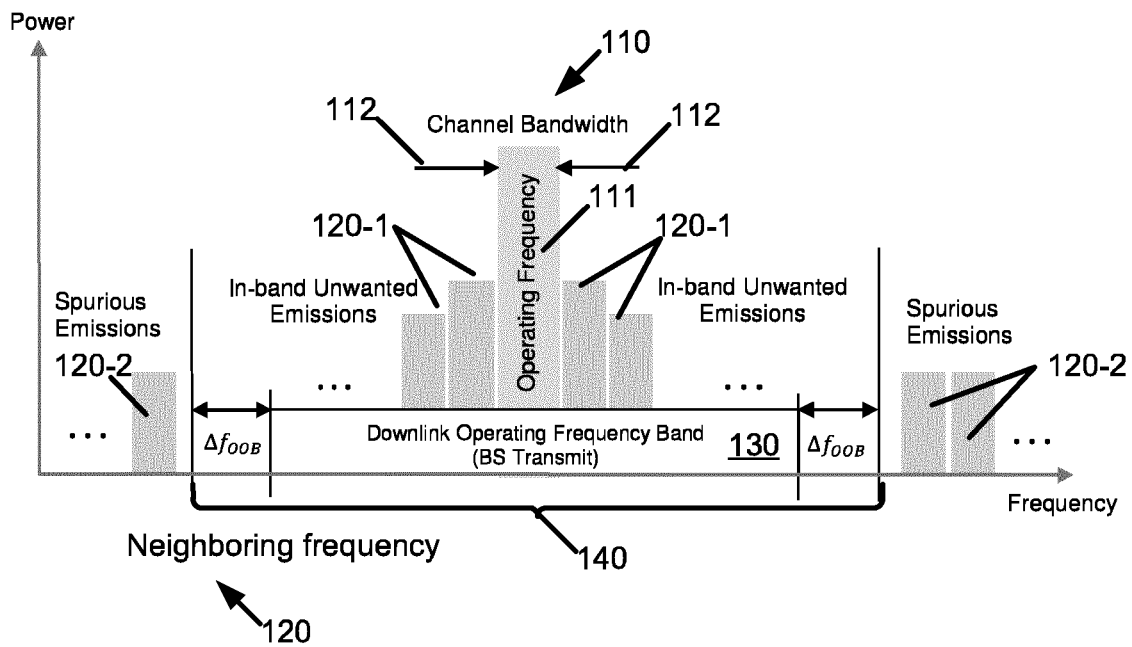
FIG. 1 is an illustration of wanted power in the operating channel and unwanted emissions in neighboring channels of a cellular base station.

The following abbreviations that may be found in the specification and/or the drawing figures are defined as follows:
3GPP third generation partnership project
5G fifth generation
BS base station
EIRP Equivalent Isotropic Radiated Power
EUT Equipment Under Test
HPBW Half-Power Beam Width
I/F interface
I/O Input/Output
N/W network
OOB Out Of Band
OTA Over The Air
RF Radio Frequency
TRP Total Radiated Power
TS Technical Standard The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

As stated above, due to, e.g., non-linear effects of Radio-Frequency (RF) components such as power amplifiers, the base station also emits power outside its channel bandwidth in neighboring frequencies, which causes interference to other base stations operating in these neighboring frequencies. The unintended power in the neighboring frequencies is also known as unwanted emissions, which are classified into in-band and spurious emissions. FIG. 1 has an illustration of wanted power in the operating channel and unwanted emissions in neighboring channels of a cellular base station. In this example, the cellular base station creates the channel bandwidth 110 based on an operating frequency 111. Although cellular base stations are primarily described herein, the techniques apply to any active-antenna systems with a large number of transmitters, of which base stations such as 5G millimeter-wave base stations are examples. The "ideal" channel bandwidth 110 is illustrated by the arrows 112. The downlink operating frequency band (e.g., the BS transmit frequency) 130 is also shown, and the channel bandwidth 110 is part of that. There are two guard bands referred to as out-of-band (OOB) frequencies, Moos, shown at either end of the operating frequency band 140.

However, the base station also produces energy in neighboring frequencies 120: multiple in-band unwanted emissions 120-1 in in-band neighboring frequencies are shown, which are adjacent the channel bandwidth 110; and the spurious emissions 120-2, which are outside the frequency band 140. Reference 120-1 indicates unwanted emissions in in-band neighboring frequencies. That it, each bar marked as 120-1 is an in-band neighboring frequency in FIG. 1. The height of the bar corresponds to the power level.

Unlike conventional base stations, 5G millimeter-wave base stations with integrated active antenna systems do not have built-in RF connectors for power measurements of both wanted and unwanted emissions. Consequently, the power emissions can only be measured Over The Air (OTA) in terms of Total Radiated Power (TRP).

To this end, 3GPP specifies several OTA test methods for TRP measurements, which are documented in Annex I, TS 38.141-2 (see 3GPP TS 38.141-2 V15.2.0 (2019-06)) and Annex F, 3GPP TS 37.145-2 (see 3GPP TS 37.145-2 V15.4.0 (2019-06)). By and large, the TRP measurement procedures can be divided into two categories, namely accurate TRP methods and overestimated TRP methods as shown in the following table:

| Accurate TRP Method | | Overestimated TRP Method |
|---|---|---|
| Beam-based directions | | Peak Method |
| Grid-based | Spherical Equal Angle | Equal Sector with Peak Average |
| | Spherical Equal Area | Orthogonal Cut with Dense Sampling Grids |
| | Spherical Fibonacci | Spherical Sparse Sampling Grids |
| | Spherical Wave-Vector Space | |
| | Orthogonal Cut | |

Figure 2:
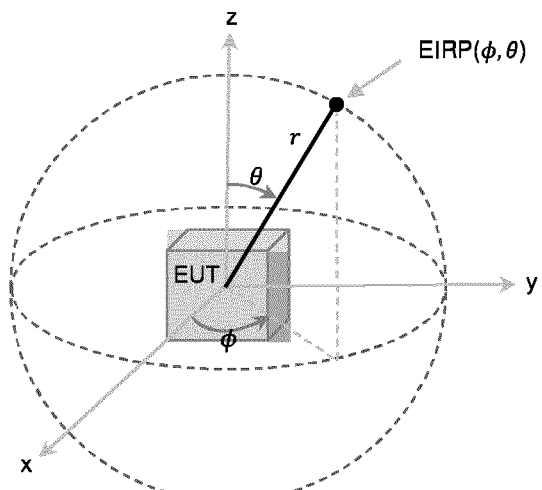
FIG. 2 is an illustration of EIRP measurements at discrete angles for estimating TRP.

The TRP measurement procedures in general consist of two steps:

1) One or more EIRP samples are measured at discrete spherical coordinates (r, $\phi$, $\theta$) around the surface of a sphere centered on the Equipment Under Test (EUT) as illustrated in FIG. 2.

2) A TRP estimate of EUT emissions is determined from the measured EIRP samples for the frequency under consideration, be it the operating frequency or neighboring frequency.

FIG. 2 is an illustration of EIRP measurements at discrete angles for estimating TRP. An EIRP is shown at a radial distance r and at ($\phi$, $\theta$) in polar coordinates, where ($\phi$) is an azimuth angle and $\theta$ is a polar angle. The EUT is also illustrated as being "centered" at the origin.

Unlike the other accurate TRP methods, the "beam-based directions" procedure needs only one EIRP sample to be measured in the direction of maximum radiation in the main lobe of EUT. Subsequently, a TRP estimate can then be computed from the EIRP sample using directivity of the EUT antenna. Such a procedure significantly reduces TRP measurement time as compared with the other methods. However, the direction of the maximum EIRP along with the directivity must be known prior to the measurement. For the frequency of operation, the latter (directivity) is a system design parameter and the former (direction of the maximum EIRP) is set by beamforming weights used. These two quantities, however, are usually unknown for spurious emissions. Consequently, the procedure is not applicable to compute TRP estimates of spurious emissions. In addition, radiation patterns of spurious emissions are in general dissimilar to those of emissions for the operating frequency.

Currently in 3GPP, the applicability of the beam-based directions procedure to compute TRP estimates of in-band unwanted emissions of active-antenna systems (such as 5G millimeter-wave base stations) is still an open issue (see: NTT DoCoMo, et al., "Way forward on TRP measurements", R4-1902272, 3GPP TSG-RAN WG4 Meeting #90, Athens, Greece, 25 Feb.-1 Mar. 2018). This is because the beam-based directions procedure assumes radiation patterns of the frequency of operation and in-band neighboring frequencies are fully correlated. This assumption is valid for conventional passive-antenna base stations. However, for active-antenna base stations, the level of correlation in the radiation pattern between the in-band neighboring and operating frequencies may be design dependent and varied from one implementation to another. Herein, the operating frequency is also known as the carrier or wanted frequency.

Figure 3A:
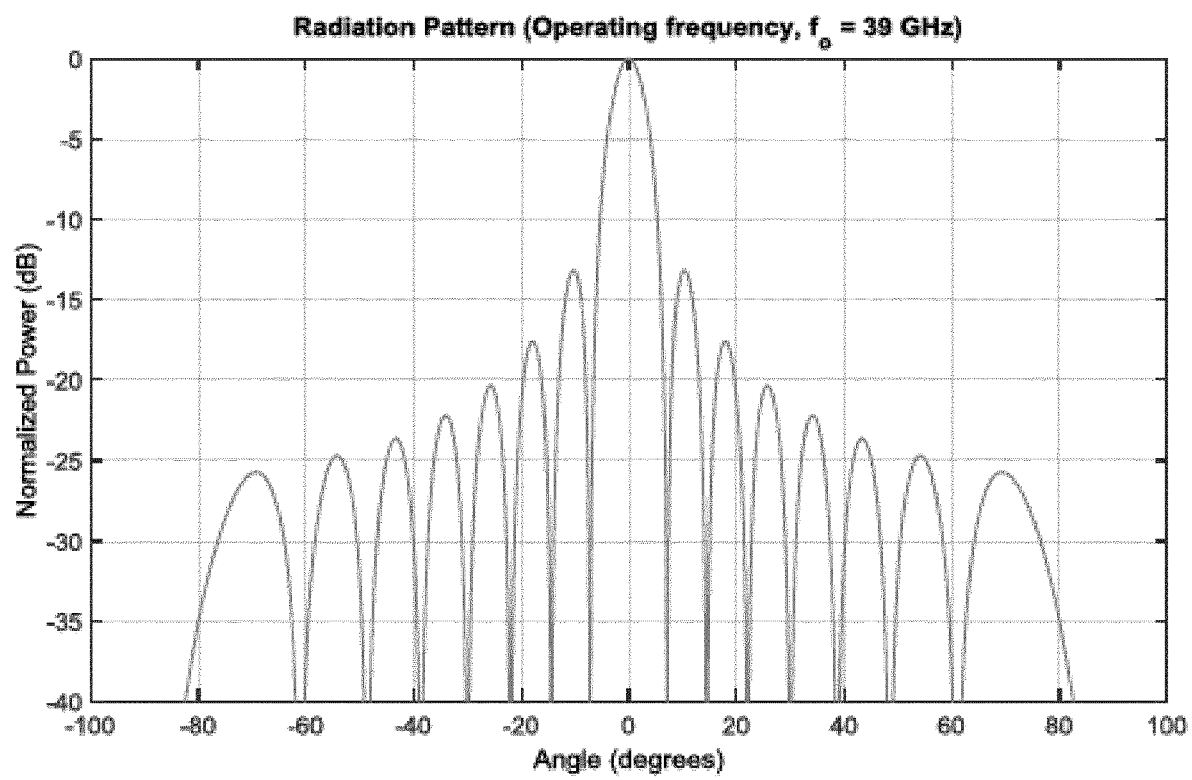
FIG. 3(a), Radiation Pattern-Operating Frequency.
Figure 3B:
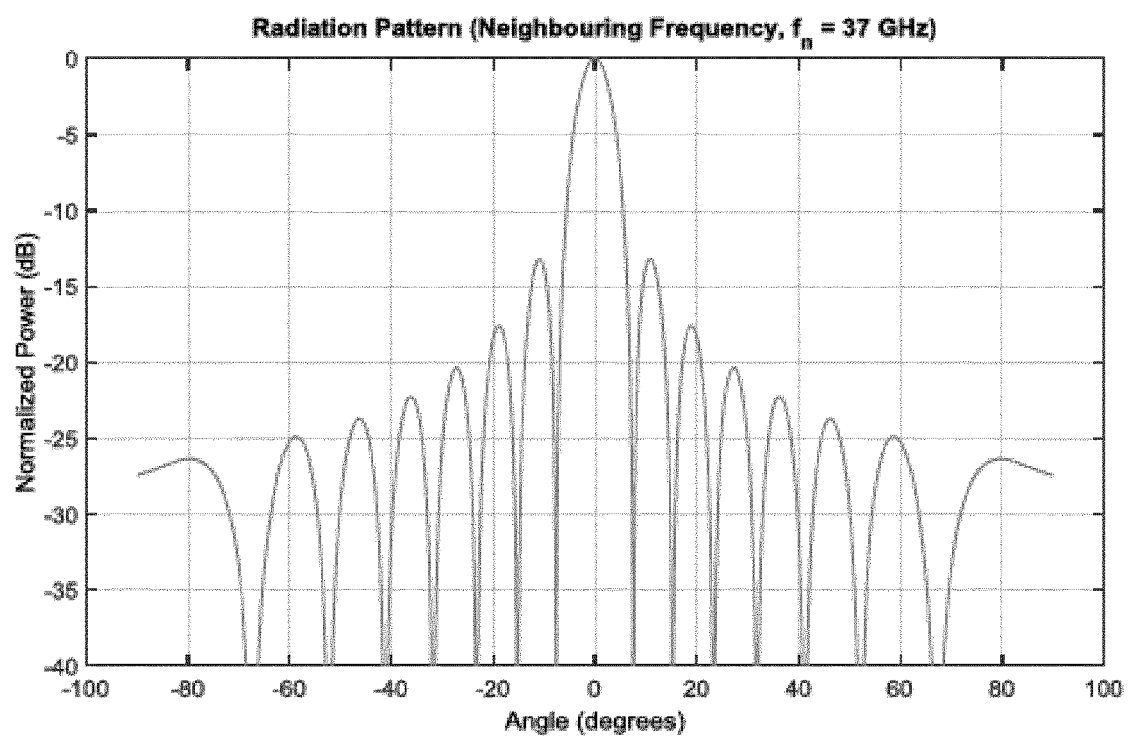
FIG. 3(b), Neighboring Frequency Radiation Pattern-Correlated with Frequency of Operation.
Figure 3C:
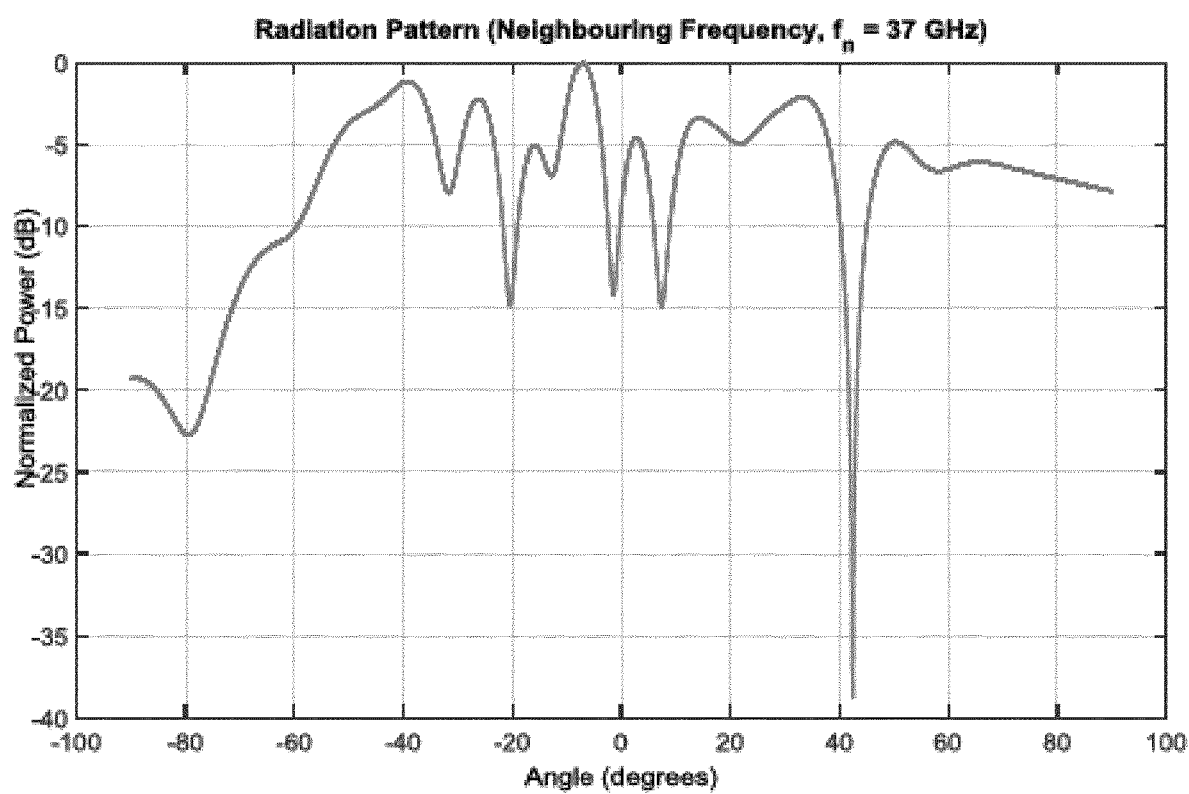
FIG. 3(c), Neighboring Frequency Radiation Pattern-Uncorrelated with Frequency of Operation.

FIG. 3 illustrates power radiation patterns of operating and in-band neighboring frequencies, and is split into the following figures: FIG. 3(a), Radiation Pattern-Operating Frequency; FIG. 3(b), Neighboring Frequency Radiation Pattern-Correlated with Frequency of Operation; and FIG. 3(c), Neighboring Frequency Radiation Pattern-Uncorrelated with Frequency of Operation. In more detail, FIG. 3 illustrates two-dimensional radiation patterns in the case of correlated and uncorrelated radiation pattern with that of the frequency of operation. The operating frequency $f_o$ is 39 GHz in FIG. 3(a). The directivity for the radiation pattern of the frequency of operation (as shown in FIG. 3(a)) is 30.1 dB; FIG. 3(b) illustrates the correlated case where the directivity for the radiation pattern is 29.7 dB while the directivity for the uncorrelated case (see FIG. 3(c)) is −7.1 dB. It is important to note that the directivity for the correlated case differs from the uncorrelated case by 36.8 dB even though the antenna array and in-band neighboring frequency (i.e., $f_n$=37 GHz) is the same. As such, the beam-based direction procedure will yield incorrect TRP estimations in the case of the uncorrelated radiation patterns, due to dissimilar directivity values with the correlated case. Consequently, a test methodology is needed to determine whether the in-band neighboring and operating frequency radiation patterns are fully correlated prior to using the procedure. The grid-based TRP methods listed in the table above can be used for such a purpose, but this would not benefit from low complexity and a very short TRP measurement time, which is a key advantage of using the beam-based directions procedure.

Referring to Annex I.10 in 3GPP TS 38.141-2 V15.2.0 (2019-06) and Annex F.10 in 3GPP TS 37.145-2 V15.4.0 (2019-06), the beam-based directions procedure computes a TRP estimate as $$TRP_{Estimate} = \frac{EIRP_{peak}}{D_{EUT}},$$ (Equation 1)

where $TRP_{Estimate}$ (in watts) is the total radiated power, $EIRP_{peak}$ (in watts) is the maximum equivalent isotropic radiated power in the main lobe of a beam and $D_{EUT}$ (dimensionless) is the directivity of the EUT antenna.

According to J. D. Kraus, Antennas, McGraw-Hill, 1989, pages 22-26 the directivity can be expressed as the ratio of the area of a sphere (i.e., $4\pi$ steradians) to the beam solid angle $\Omega_A$ of the EUT antenna, i.e., $$D_{EUT} = \frac{4\pi}{\Omega_A} \approx \frac{4\pi}{\phi_{HPBW}\theta_{HPBW}},$$ (Equation 2)

where $\phi_{HPBW}$ and $\theta_{HPBW}$ are the half-power beam width (in radians) on the spherical azimuth and elevation planes, respectively. Note that the approximation in Equation (2) is generic and is not constrained to any particular types of antenna array; more accurate approximations for specific cases can be found in C. A. Balanis, Antenna Theory: Analysis and Design, Third edition, Wiley, 2005, pages 50-52 which can be used to replace the relation here. For instance, 5G millimeter-wave base stations employ large-scale uniform rectangular antenna arrays along with advanced beamforming techniques, producing highly directional narrow (e.g., so-called "pencil") beams. Hence, Equation (2) can be approximated by Balanis:

$$D_{EUT} \approx \frac{\pi^2}{\phi_{HPBW}\theta_{HPBW}}.$$ (Equation 3)

In the case the maximum radiation of an antenna array is broadside (i.e., the main beam is directed perpendicular to the axis of the antenna array), $\phi_{HPBW}$ and $\theta_{HPBW}$ in Equation (3) can be approximated by S. J. Orfanidis, Electromagnetic Waves and Antennas, 2016, pages 1106-1110:

$$\phi_{HPBW} \approx 0.886\frac{\lambda}{D_\phi},$$ (Equation 4)

$$\theta_{HPBW} \approx 0.886\frac{\lambda}{D_\theta},$$ (Equation 5)

where $\lambda$ is the wavelength, and the quantities $D_\phi$ and $D_\theta$ are the largest dimension of antenna arrays on the spherical azimuth and elevation planes, respectively. It is also noted that the Orfanidis material may be downloaded from the website eceweb1.rutgers.edui~orfanidi/ewa/, printed books may be ordered, and additional material may be found on that website.

It can be deduced from Equations (2) and (3) that the directivity-beam width is a constant, implying as one decreases, the other increases by the same proportion.

An overview of the exemplary embodiments is now presented. The exemplary embodiments herein relate to the field of radiated power measurement during conformance testing of wireless communications systems, in particular, fifth-generation millimeter-wave cellular base stations. Wanted and unwanted emission power radiated by cellular base stations may be measured over the air in terms of TRP (Total Radiated Power). "Beam-based directions" is one of the TRP measurement procedures standardized by 3GPP. However, the applicability of such a procedure to compute TRP estimates of emission power for in-band neighboring frequencies remains an open issue in 3GPP, as pointed out above. One exemplary aim of the embodiments herein is to address the aforementioned open issue by advocating a test method which can be used to determine if correlation exists between radiation patterns of the operating and in-band neighboring frequencies; and if so, the beam-based directions procedure can be applied. An exemplary embodiment of the advocated test method establishes three correlation test criteria that should to be satisfied before a conclusion can be made concerning the correlation of the radiation patterns. The three correlation test criteria in this exemplary embodiment are as follows:

1) Azimuth and elevation half-power angular ratio quantities of in-band neighboring frequency radiation patterns match those of the operating frequency. This criterion ensures that the main lobe of the operating and in-band neighboring frequencies with respect to the axis of maximum radiation has similar symmetry. Note that the axis of maximum radiation is passing through the center of the main lobe.

2) Measured azimuth and elevation HPBWs match those that are derived from HPBWs of operating frequency radiation patterns.
3) The product of measured azimuth and elevation HPBWs and directivity for an in-band neighboring frequency corresponds to the directivity-beam width product for the operating frequency.

One exemplary advantage of these techniques is that they retain the simplicity of the beam-based directions procedure and, more importantly, a short TRP measurement time. An exemplary technique needs only four half-power angular measurements in addition to the maximum power measurement in the main lobe in order to compute TRP estimates of in-band neighboring frequencies.

One exemplary procedure is as follows:
a. Measure azimuth and elevation half-power angles and compute azimuth and elevation half-power angular ratio quantities for the first correlation criterion.
b. Test for the second correlation criterion, e.g., by computing azimuth and elevation HPBWs using HPBWs of the operating frequency.
3. Test for the third criterion, e.g., by computing directivity-beam width of in-band neighboring and operating frequencies.

Now that an overview of the exemplary embodiments has been presented, additional exemplary details are presented. The exemplary embodiments relate to a radiated power measurement method and test system of base stations such as 5G millimeter-wave base stations for determining whether a radiation pattern of in-band neighboring frequencies is fully correlated with that of the operating frequency, and if so, a beam-based directions procedure can be applied to compute TRP estimates. Correlation is a measure of how much the radiation pattern of in-band neighboring frequencies resembles that of the frequency of operation. Mathematically, the correlation of two different radiation patterns (between the operating frequency, $f_o$, radiation pattern and the neighbor frequency, $f_n$, radiation pattern) can be expressed as $$R_{on}(\Delta\theta,\Delta\phi)=\int_{\theta=0}^{\pi}\int_{\phi=0}^{2\pi}U_o(\theta,\phi)U_n(\theta-\Delta\theta,\phi-\Delta\phi)d\phi d\theta, \quad \text{Equation (6)}$$

where $U_o(\theta, \phi)$ is the radiation pattern (e.g., radiation intensity) of the operating frequency, $U_n(\theta-\Delta\theta, \phi-\Delta\phi)$ is the radiation pattern of the in-band neighboring frequency, $\Delta\phi$ is the displacement (or lag) in the $\phi$ angle, and $\Delta\theta$ is the displacement in the $\theta$ angle. It should be noted that in signal processing this type of correlation is referred to as cross-correlation.

Figure 4A:
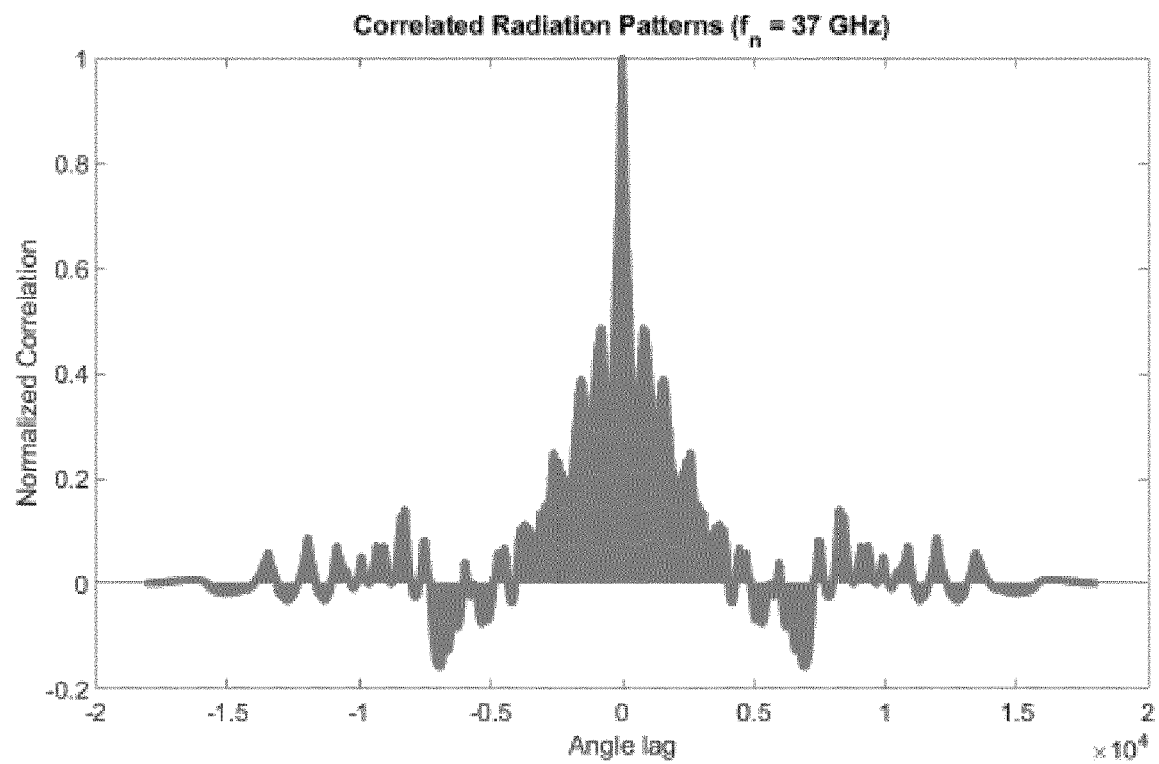
FIG. 4(a), High Correlation Level—illustrating the result of correlating FIG. 3(a) with FIG. 3(b)
Figure 4B:
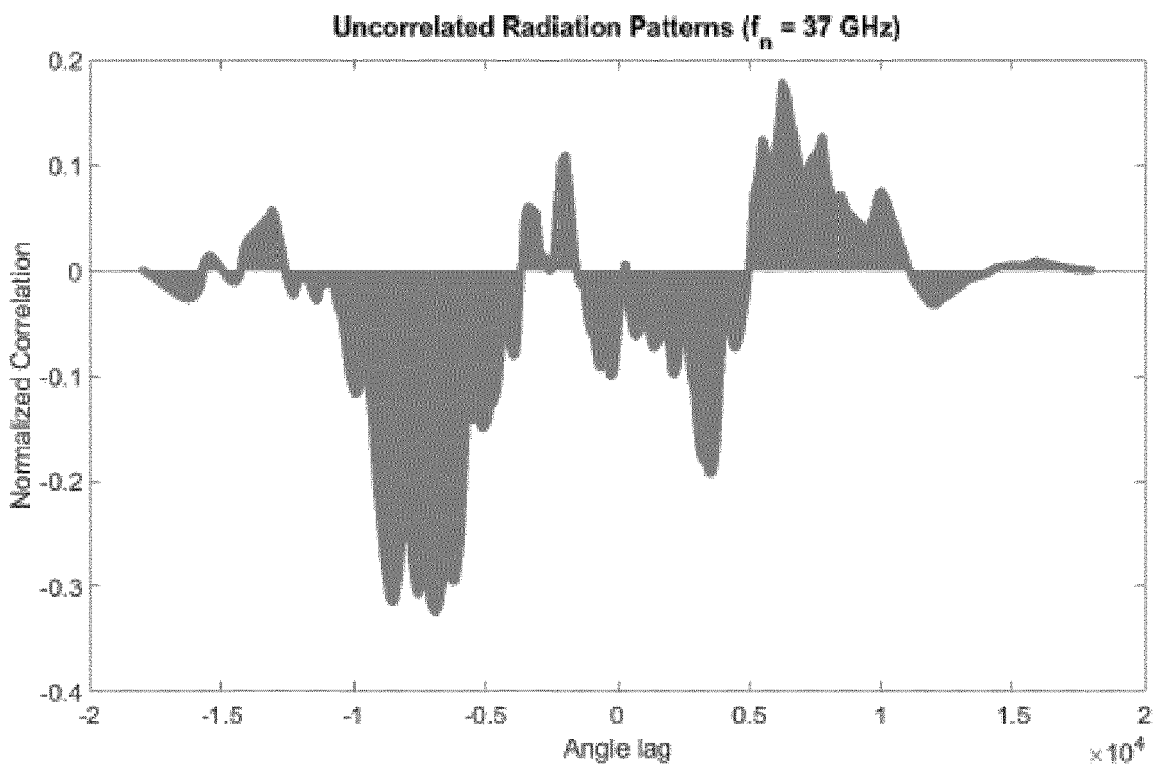
FIG. 4(b), Low Correlation Level—illustrating the result of correlating FIG. 3(a) with FIG. 3(c)

FIG. 4 illustrates correlation of the radiation patterns shown in FIG. 3, and is split into the following figures: FIG. 4(a), High Correlation Level—illustrating the result of correlating FIG. 3(a) with FIG. 3(b); and FIG. 4(b), Low Correlation Level—illustrating the result of correlating FIG. 3(a) with FIG. 3(c). In additional detail, FIG. 4 illustrates the normalized correlation level obtained using the radiation patterns in FIG. 3, where $U_0(\theta, \phi)$ was set to the operating frequency radiation pattern in FIG. 3(a). The plot in FIG. 4(a) exhibits a peak at angle lag=0° because $U_n(\theta-\Delta\theta, \phi-\Delta\phi)$ was set to the radiation pattern in FIG. 3(b), while no such peak exists in FIG. 4(b) for $U_n(\theta-\Delta\theta, \phi-\Delta\phi)$ set to the radiation pattern in FIG. 3(c). It can be concluded from the plots in FIG. 4 that correlation level reaches the peak provided there is a main lobe present in the radiation pattern of the neighboring frequency where the maximum radiation occurs in the same direction as that of the operating frequency.

Figure 5:
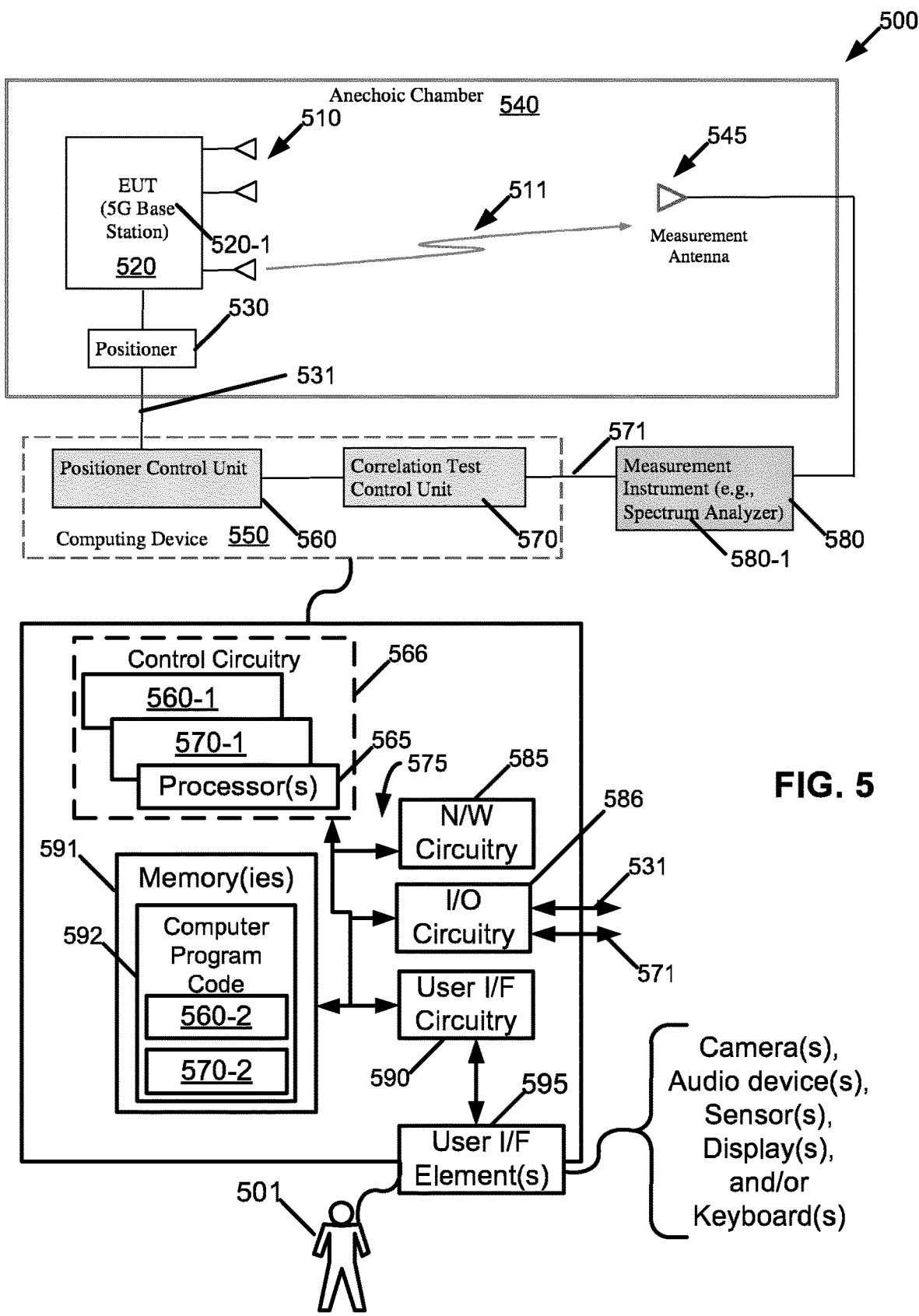
FIG. 5 is a block diagram an exemplary test system, in accordance with an exemplary embodiment.

Based on the aforementioned exemplary conclusions, an exemplary embodiment herein establishes the minimum number of measurements that need to be performed during conformance testing in order to determine if radiation patterns of in-band neighboring frequencies are correlated with the radiation pattern of the operating frequency. Referring to FIG. 5, this figure illustrates an exemplary test system 500 which may include an EUT 520 (in this example, a 5G base station 520-1), a wireless communications link 511 coupling the antenna(s) 510 of the base station 520 to a measurement antenna 545, a positioner 530, a positioner control unit 560, a correlation test control unit 570, and a measurement instrument 580 (e.g., a spectrum analyzer 580-1). The positioner control unit 560 and correlation test control unit 570 are part of a computing device 550. The power measurement test may be performed in a controlled enclosed environment (such as an RF anechoic chamber 540 or a compact antenna test range chamber). The EUT 520 is typically mounted on the positioner 530, which moves the EUT 520 to different spatial angular positions fed by the positioner control unit 560. The positioner 530 is a piece of hardware built for moving the EUT in three-dimensional space. An example of an EUT 520 may be a 5G millimeter-wave active-antenna base station 520-1 with multiple antennas 510 that can form beams steered to a specific direction in the three-dimensional space. The correlation test control unit 570 may be used to validate the correlation of radiation patterns between the operating and neighboring frequencies based on measured HPBW angles. That is, if correlation is identified during the validation test, the correlation test control unit 570 computes TRP estimates using the beam-based directions procedure. It should be noted that even though the positioner control unit 560 and correlation test unit 570 are illustrated as separate components, the two could be running on the same computing device 550 as shown in FIG. 5.

The computing device 550 is a computer system and comprises in an example control circuitry 566, one or more memories 591, network (N/W) circuitry 585, Input/Output (I/O) circuitry 586, user interface (I/F) circuitry 590, interconnected through buses 575. The control circuitry 566 comprises one or more processors 565, a positioner control unit 560-1, and a correlation test control unit 570-1. The one or more memories 591 include computer program code 592 comprising a positioner control unit 560-2 and a correlation test control unit 570-2. The buses 575 may be address, data, or control buses, and may include any interconnection mechanism, such as a series of lines on a motherboard or integrated circuit, fiber optics or other optical communication equipment, and the like.

The positioner control unit 560 and the correlation test control unit 570 may be implemented in hardware, such as in circuitry 566, e.g., as part of the one or more processors 565 or via other circuitry such as user-programmable logic devices or application-specific integrated circuits, as positioner control unit 560-1 and correlation test control unit 570-1. They may also be implemented in software, in computer programmable code as positioner control unit 560-2 and correlation test control unit 570-2. The one or more memories 591 and the computer program code 592 may be configured to, with the one or more processors 565, e.g., after accessing, loading, and executing the positioner control unit 560-2 and correlation test control unit 570-2, cause the computing device 550 to perform one or more of the operations as described herein.

The user I/F elements 595 may or may not be part of the computing device 550, and may include one or more of the following examples: camera(s), audio device(s), sensor(s), display(s), and/or keyboard(s). The display(s) may be a touch screen or external monitor. Some or all of the user I/F elements 595 may be internal or external to the computing device 550.

The computing device (550) in an exemplary embodiment may be a generic personal computer (PC), although it is possible to be a special-purpose or other computer system. The positioner control unit 560 and correlation test control unit 570 may then be implemented as software programs. The positioner 530 is special-constructed device made for this purpose. The movement of this positioner 530 is controlled by the positioner control unit 570 in the computing device 550. The correlation test control unit 570 will provide the positioner control unit 560 with angular positions for moving the EUT 520 to a particular direction in three-dimensional space. For example, to measure EIRP in the direction where the maximum EIRP of operating frequency $f_o$ occurs, the positioner control unit 560 will set the positioner 530 to the angular position provided by the correlation test control unit 570. The positioner 530 will in turn move the EUT 520 to the corresponding angular position where maximum EIRP can be measured by the measurement antenna 545.

The I/O circuitry 585 allows communication (e.g., and control) over the links 531 and 571. The N/W circuitry 585 may be used and contains circuitry to communicate via one or both of wired or wireless networks (not shown).

Figure 6:
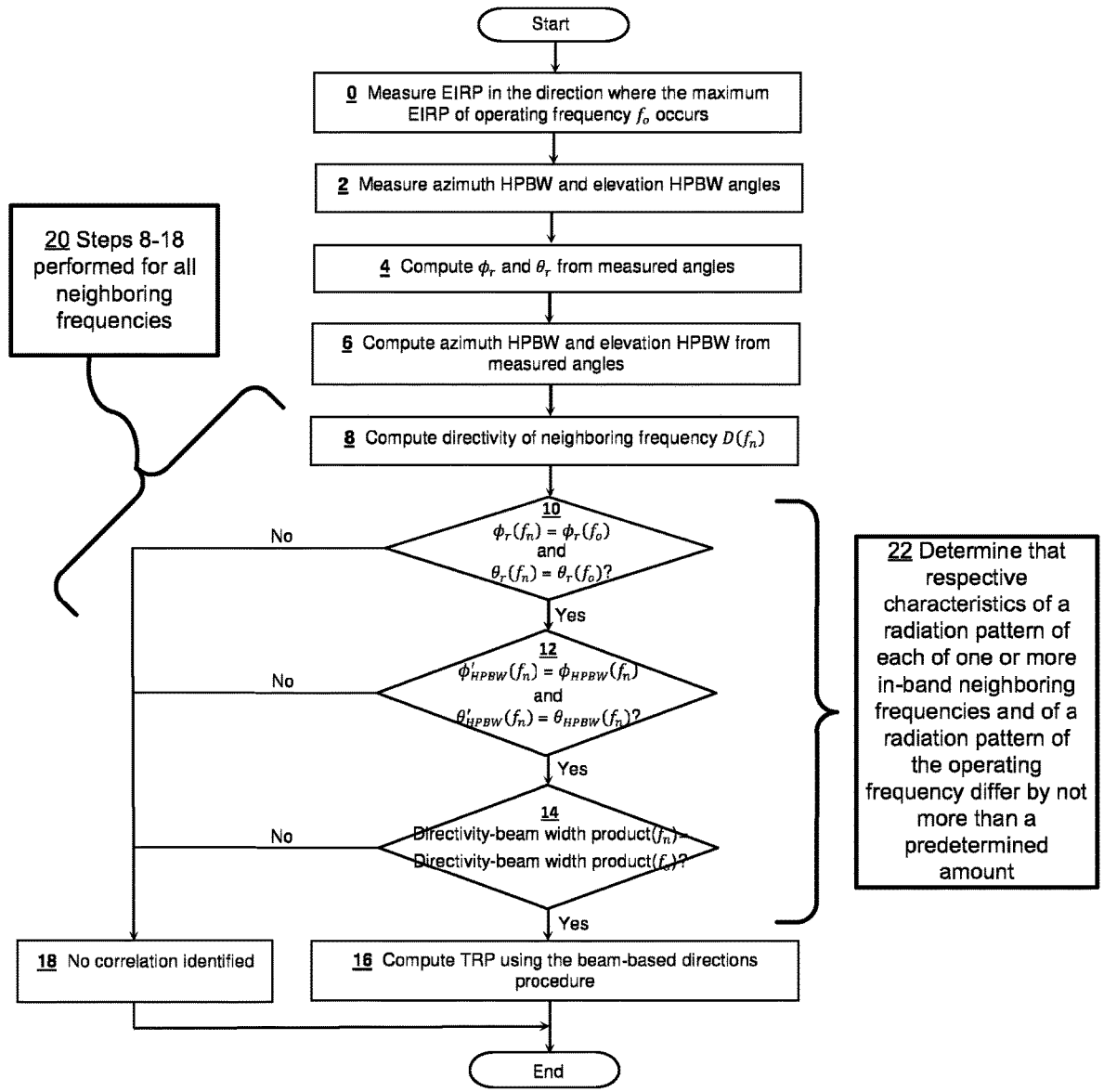
FIG. 6 is a flowchart depicting an exemplary method for determining the correlation of radiation patterns according to an exemplary embodiment.
Figure 7:
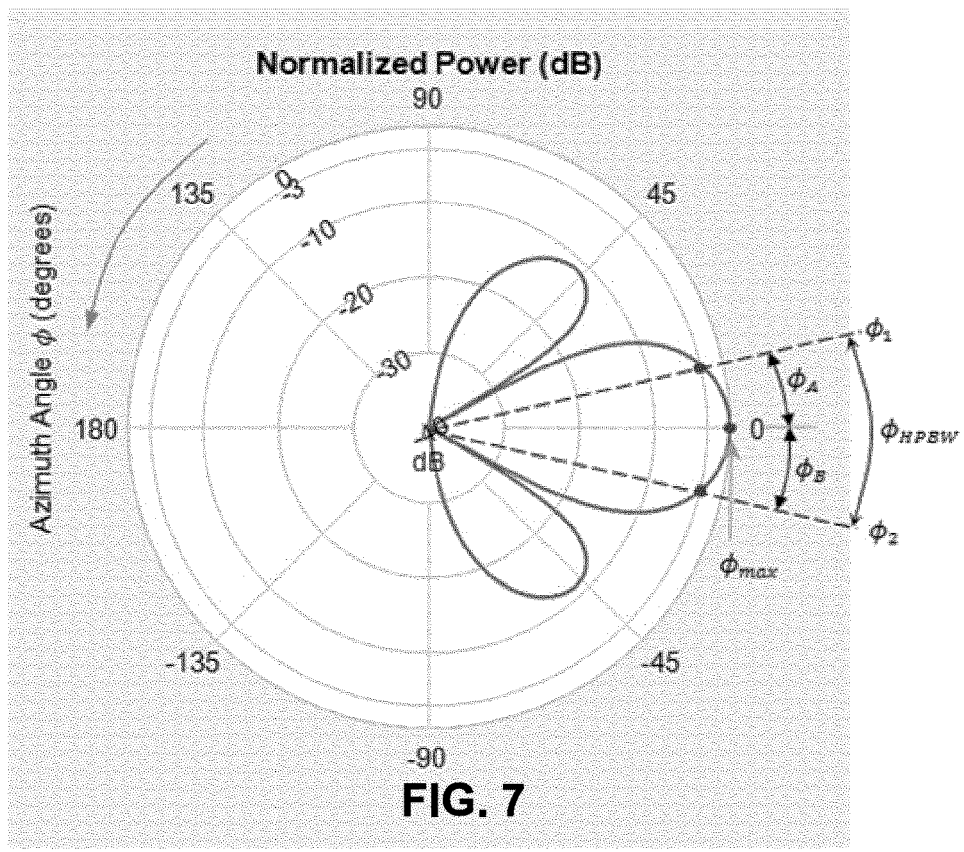
FIGS. 7 and 8 are two-dimensional radiation patterns on spherical azimuth and elevation planes, respectively.

Referring to FIG. 6, this figure is a flow diagram embodying an exemplary method in an exemplary embodiment. The disclosed radiated power measurement method as illustrated in FIG. 6, which is used to determine whether correlated radiation patterns exist between the operating and in-band neighboring frequencies, may be performed by the correlation test control unit 570, e.g., implemented by the computing device 550. This method includes measuring EIRP of an in-band neighboring frequency $f_n$ in the same direction as the main-lobe maximum EIRP of the EUT for the frequency of operation $f_o$ (step 0), which is followed by measuring azimuth half-power beam width (HPBW) angles $\phi_1$ and $\phi_2$, and elevation half-power beam width (HPBW) angles $\theta_1$ and $\theta_2$ in step 2. In step 4, two half-power angular ratio quantities, viz. $\phi_r$ and $\theta_r$ are computed from the measured half-power angles, which is described hereafter. Referring to FIG. 7, this figure shows a two-dimensional radiation pattern on the spherical azimuth plane with the maximum radiation at $\phi=0°$. The angular separation $\phi_A$ (in radians) is defined as the angle subtended by two lines drawn from a reference point in the center of the circle intersecting with the main-lobe maximum power and a pair of half-power points, which is the following:

$$\phi_A = |\phi_{max} - \phi_1|. \quad \text{(Equation 7)}$$

$\phi_B$ is the counterpart of $\phi_A$, but the subtended angle is with the opposite half-power angle in the main lobe as shown in FIG. 7, which is the following:

$$\phi_B = |\phi_{max} - \phi_2|. \quad \text{(Equation 8)}$$

The ratio of these two subtended angles is defined as the following:

$$\phi_r = \frac{\phi_A}{\phi_B}. \quad \text{(Equation 9)}$$

$\phi_r$ ($f_n$) and $\phi_r$ ($f_o$) denote $\phi_r$ at an in-band neighbouring frequency $f_n$ and operating frequency $f_o$, respectively.

Figure 8:
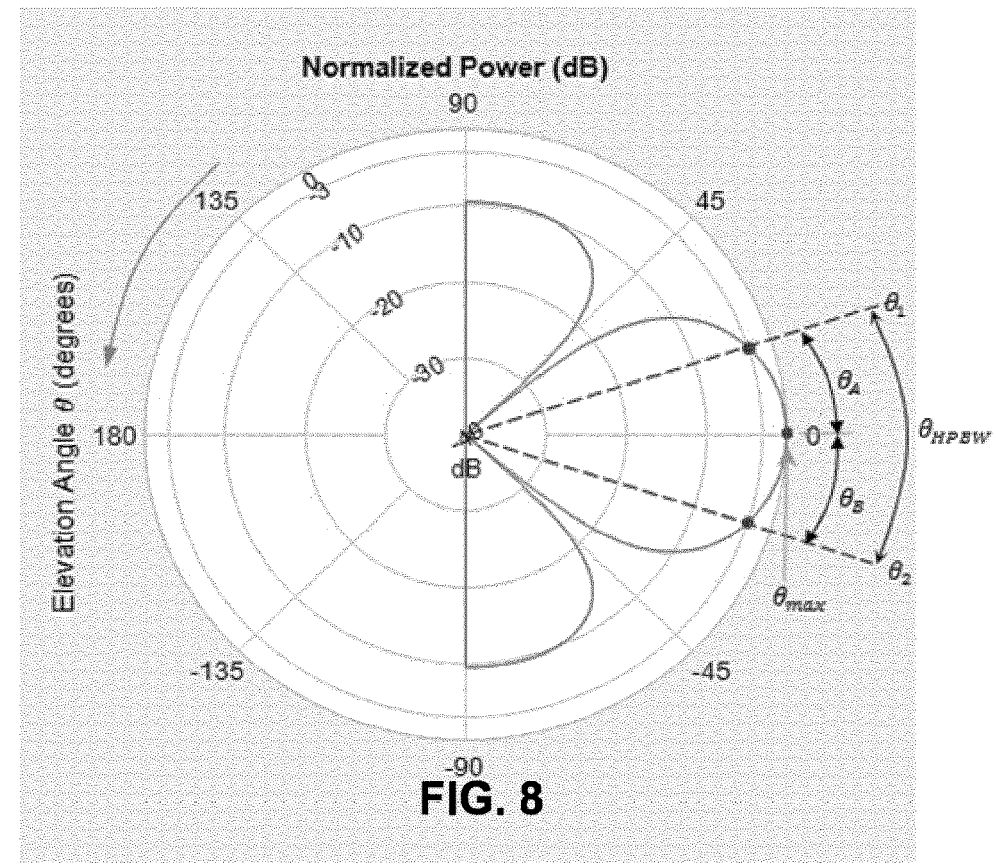

FIG. 8 shows a radiation pattern on the spherical elevation plane with maximum radiation at $\theta=0°$. The angular separation $\theta_A$ (in radians) defined as the angle subtended by two lines drawn from a reference point in the center of the circle to intersect with the main-lobe maximum power and a pair of half-power points, which is the following:

$$\theta_A = |\theta_{max} - \theta_1|. \quad \text{(Equation 10)}$$

$\theta_B$ is the counterpart of $\theta_A$, but the subtended angle is with the opposite half-power angle in the main lobe as shown in FIG. 7, which is $$\theta_B = |\theta_{max} - \theta_2|. \quad \text{(Equation 11)}$$

The ratio of these two subtended angles is defined as $$\theta_r = \frac{\theta_A}{\theta_B}. \quad \text{(Equation 12)}$$

$\theta_r$ ($f_n$) and $\theta_r$($f_o$) denote $\theta_r$ at an in-band neighboring frequency $f_n$ and operating frequency $f_o$, respectively.

Referring back to FIG. 6, in step 6, the azimuth and elevation HPBWs are computed from the measured half-power angles as shown in Equations (13) and (14), respectively.

$$\phi'_{HPBW} = |\phi_1 - \phi_2|, \text{ and} \quad \text{(Equation 13)}$$

$$\theta'_{HPBW} = |\theta_1 - \theta_2|. \quad \text{(Equation 14)}$$

The azimuth and elevation HPBWs at an in-band neighboring frequency $f_n$ can also be expressed in terms of the corresponding HPBWs at an operating frequency $f_o$. Using Equations (4) and (5), the azimuth HPBW at the neighboring frequency is defined as $$\phi_{HPBW}(f_n) = \frac{\lambda_n}{\lambda_o}\phi_{HPBW}(f_o) = \frac{f_o}{f_n}\phi_{HPBW}(f_o), \quad \text{(Equation 15)}$$

where $\phi_{HPBW}(f_o)$ is the azimuth HPBW at the operating frequency $f_o$, $\lambda_o$ is the wavelength of $f_o$, and $\lambda_n$ is the wavelength of in-band neighbouring frequency $f_n$.

The elevation HPBW at an in-band neighboring frequency $f_n$ is defined as the following:

$$\theta_{HPBW}(f_n) = \frac{\lambda_n}{\lambda_o}\theta_{HPBW}(f_o) = \frac{f_o}{f_n}\theta_{HPBW}(f_o), \quad \text{(Equation 16)}$$

where $\theta_{HPBW}(f_o)$ is the elevation HPBW at the operating frequency $f_o$, and $\lambda_o$ and $\lambda_n$ are defined as in Equation (14).

As the directivity of an antenna is frequency dependent, it can be expressed in terms of the directivity of the operating frequency, see step 8. Using Equations (2), (15) and (16), the directivity of in-band neighboring frequency $f_n$ is $$D_{EUT}(f_n) = \left(\frac{\lambda_o}{\lambda_n}\right)^2 D_{EUT}(f_o) = \left(\frac{f_n}{f_o}\right)^2 D_{EUT}(f_o), \quad \text{(Equation 17)}$$

where $D_{EUT}(f_o)$ is the directivity of the operating frequency $f_o$, $\lambda_o$ is the wavelength of $f_o$ and $\lambda_n$ is the wavelength of an in-band neighboring frequency $f_n$.

Steps 10, 12 and 14 outline three exemplary correlation criteria that should be satisfied by the EUT for each of the in-band neighboring frequencies to be tested. The first correlation criterion (step 10) states the azimuth and elevation half-power angular ratio quantities for in-band neighboring frequency $f_n$, which are $\phi_r(f_n)$ and $\theta_r(f_n)$, respectively, should match the corresponding quantities for the operating frequency $f_o$. This criterion ensures that the main lobe of the operating and in-band neighboring frequencies with respect to the axis of maximum radiation has similar symmetry; the axis of maximum radiation is passing through the center of the main lobe. In the second criterion (step 12), the measured azimuth and elevation HPBWs should be equivalent to the corresponding HPBWs calculated using Equations (15) and (16), respectively. In the last criterion (step 14), the directivity-beam width product for an in-band neighboring frequency $f_n$ is calculated using the directivity in Equation (17) and the measured azimuth and elevation HPBWs in Equations (13) and (14) should correspond to the directivity-beam width product for the operating frequency, which is the following:

$$\frac{D_{EUT}(f_n)\phi'_{HPBW}(f_n)\theta'_{HPBW}(f_n)}{directivity - beamwidth product(f_n)} = \frac{D_{EUT}(f_o)\phi_{HPBW}(f_o)\theta_{HPBW}(f_o)}{directivity - beamwidth product(f_o)}$$ (Equation 18)

$D_{EUT}(f_n)$, $\phi'_{HPBW}(f_n)$ and $\theta'_{HPBW}(f_n)$ are calculated according to Equations (17), (13) and (14) for an in-band neighboring frequency $f_n$, respectively. $D_{EUT}(f_o)$, $\phi_{HPBW}(f_o)$ and $\theta_{HPBW}(f_o)$ are directivity, azimuth and elevation HPBWs of the operating frequency $f_o$, respectively, which are usually known design parameters.

It is noted that for FIG. 6 and steps 10-14, $f_o$ is the operating frequency, and one $f_o$ is assumed for the entire operating frequency band to be tested. With respect to the operating frequency band, there are one or more in-band neighboring frequencies to be tested, where $f_n$ denotes an in-band neighboring frequency. For example, n=1, 2, 3, ..., 100. Then, there would be $f_1, f_2, f_3, f_4, \ldots, f_{100}$. Since there are one or more $f_n$, $\phi_r(f_n)$ and $\theta_r(f_n)$ need to be calculated for each $f_n$ (in-band neighboring frequency). However, $\phi_r(f_o)$ and $\theta_r(f_o)$ need to be calculated once and reused in steps 10-14 for each in-band neighboring frequency $f_n$ to be tested. It depends on the capability of the measurement antenna, measurement instrument, etc., as it is possible to perform several neighboring frequencies (e.g., $f_1$ to $f_{10}$) at once. If steps 10-14 pass (meet all the criteria in an exemplary embodiment) then step 16 is performed for each of the one or more $f_n$.

In an exemplary embodiment, if any of the aforementioned three criteria is not met (any one of steps 10, 12, or 14=No), then it can be concluded that there is no correlation in the radiation patterns between the in-band neighboring and operating frequency step 18, otherwise (each of steps 10, 12, or 14=Yes) the beam-based directions procedure can be used step 16. The TRP estimate for frequency $f_n$ is calculated from the maximum EIRP sample measured in step 0 and the directivity determined using Equation (17). The calculated TRP estimate is used to demonstrate conformance to the specified in-band unwanted emissions requirement for the neighbor frequency $f_n$. That is, the TRP estimate is the final output a total radiated power in a neighbor frequency (not the entire band), and the channel bandwidth of each neighbor frequency is specified in a 3GPP TS as measurement bandwidth.

As additional points of clarification, one illustrated by step 20, is that steps 8 through 18 would be performed for each of the neighboring frequencies $f_n$. Furthermore, steps 10, 12, and 14 are specific criteria that can be generalized as in step 22. In step 22, it is determined whether respective characteristics of the radiation pattern of each of one or more in-band neighboring frequencies and of the radiation pattern of the operating frequency differ by not more than a predetermined amount. That is, there is one radiation pattern per neighbor frequency $f_n$ and there is also one radiation pattern for $f_o$. Additionally, in terms of elements "matching" in any of the steps of FIG. 6, there could be some predetermined amount within which the elements are considered to match, and outside of which the elements are not considered to match. The predetermined amount could be, e.g., ten percent or less. The predetermined amount may differ between one or more steps 10, 12 and 14. Moreover, although all three steps 10, 12, and 14 may be performed, it may be possible in some implementations to perform one or two of these instead of all three.

The following are additional examples.

Example 1. A method, comprising:
determining, for a base station that transmits on an operating frequency in part of a frequency band, whether a radiation pattern of each of one or more in-band neighboring frequencies is correlated with a radiation pattern of the operating frequency; and
in response to a determination that the radiation pattern of each of the one or more in-band neighboring frequencies is correlated with that of the operating frequency, computing a total radiated power estimate of each of the one or more in-band neighboring frequencies by performing a beam-based directions procedure for the base station, and outputting the total radiated power estimates of each of the one or more in-band neighboring frequencies.

Example 2. The method of example 1, wherein determining whether a radiation pattern of each of the one or more in-band neighboring frequencies is correlated with that of the operating frequency further comprises determining that a respective characteristic of the radiation pattern of each of the one or more in-band neighboring frequencies and of the radiation pattern of the operating frequency differ by not more than a predetermined amount.

Example 3. The method of example 2, wherein determining that a respective characteristic of the radiation pattern of each of the in-band neighboring frequency and of the radiation pattern of the operating frequency differ by not more than a predetermined amount further comprises determining whether one or more of three correlation test criteria are or are not satisfied.

Example 4. The method of example 3, wherein the three correlation test criteria comprise the following for a given in-band neighbor frequency:
azimuth and elevation half-power angular ratio quantities of the given in-band neighboring frequency radiation pattern match those of the operating frequency;
measured azimuth and elevation half-power beam widths of the given in-band neighboring frequency match those that are derived from half-power beam widths of operating frequency radiation patterns; and
a product of measured azimuth and elevation half-power beam widths and directivity for the given in-band neighboring frequency matches to a directivity-beam width product for the operating frequency.

Example 5. The method of example 4, wherein determining whether a radiation pattern of each of the one or more in-band neighboring frequencies is correlated with that of the operating frequency determines that the radiation pattern of each of the one or more in-band neighboring frequencies is correlated with that of the operating frequency only in response to all three correlation test criteria being satisfied for each of the one or more in-band neighboring frequencies.

Example 6. The method of any of examples 1 to 5, wherein computing a total radiated power estimate of each of the one or more in-band neighboring frequencies by performing the beam-based directions procedure for the base station comprises computing a total radiated power estimate for a neighbor frequency $f_n$ that is calculated from a measured maximum equivalent isotropic radiated power sample measured in a direction of maximum radiation in a main lobe of the radiation pattern of the base station.

Example 7. The method of example 6, wherein the maximum radiation in the main lobe uses directivity $D_{EUT}(f_n)$ determined using the following:

$$D_{EUT}(f_n) = \left(\frac{\lambda_o}{\lambda_n}\right)^2 D_{EUT}(f_o) = \left(\frac{f_n}{f_o}\right)^2 D_{EUT}(f_o),$$

where $D_{EUT}(f_o)$ is directivity of the operating frequency $f_o$, $\lambda_o$ is a wavelength of $f_o$, and $\lambda_n$ is a wavelength of the in-band neighboring frequency $f_n$.

Example 8. The method of any of examples 1 to 7, wherein the base station comprises an active-antenna base station with multiple antennas that can form beams steered to specific directions in a three-dimensional space.

Example 9. The method of any of examples 1 to 8, wherein the computed total radiated power estimates are used to demonstrate conformance to one or more specified in-band unwanted emissions requirements for each of the in-band neighboring frequencies.

Example 10. A computer program, comprising code for performing the methods of any of examples 1 to 9, when the computer program is run on a computer.

Example 11. The computer program according to example 10, wherein the computer program is a computer program product comprising a computer-readable medium bearing computer program code embodied therein for use with the computer.

Example 12. The computer program according to example 10, wherein the computer program is directly loadable into an internal memory of the computer.

Example 13. An apparatus, comprising:
means for determining, for a base station that transmits on an operating frequency in part of a frequency band, whether a radiation pattern of each of one or more in-band neighboring frequencies is correlated with a radiation pattern of the operating frequency; and
means, responsive to a determination that the radiation pattern of each of the one or more in-band neighboring frequencies is correlated with that of the operating frequency, for computing a total radiated power estimate of each of the one or more in-band neighboring frequencies by performing a beam-based directions procedure for the base station, and outputting the total radiated power estimates of each of the one or more in-band neighboring frequencies Example 14. The apparatus of example 13, wherein the means for determining whether a radiation pattern of each of the one or more in-band neighboring frequencies is correlated with that of the operating frequency further comprises means for determining that a respective characteristic of the radiation pattern of each of the one or more in-band neighboring frequencies and of the radiation pattern of the operating frequency differ by not more than a predetermined amount.

Example 15. The apparatus of example 14, wherein the means for determining that a respective characteristic of the radiation pattern of each of the in-band neighboring frequency and of the radiation pattern of the operating frequency differ by not more than a predetermined amount further comprises means for determining whether one or more of three correlation test criteria are or are not satisfied.

Example 16. The apparatus of example 15, wherein the three correlation test criteria comprise the following for a given in-band neighbor frequency:
azimuth and elevation half-power angular ratio quantities of the given in-band neighboring frequency radiation pattern match those of the operating frequency;
measured azimuth and elevation half-power beam widths of the given in-band neighboring frequency match those that are derived from half-power beam widths of operating frequency radiation patterns; and
a product of measured azimuth and elevation half-power beam widths and directivity for the given in-band neighboring frequency matches to a directivity-beam width product for the operating frequency.

Example 17. The apparatus of example 16, wherein the means for determining whether a radiation pattern of each of the one or more in-band neighboring frequencies is correlated with that of the operating frequency determines that the radiation pattern of each of the one or more in-band neighboring frequencies is correlated with that of the operating frequency only in response to all three correlation test criteria being satisfied for each of the one or more in-band neighboring frequencies.

Example 18. The apparatus of any of examples 13 to 17, wherein the means for computing a total radiated power estimate of each of the one or more in-band neighboring frequencies by performing the beam-based directions procedure for the base station comprises means for computing a total radiated power estimate for a neighbor frequency $f_n$ that is calculated from a measured maximum equivalent isotropic radiated power sample measured in a direction of maximum radiation in a main lobe of the radiation pattern of the base station.

Example 19. The apparatus of example 18, wherein the maximum radiation in the main lobe uses directivity $D_{EUT}(f_n)$ determined using the following:

$$D_{EUT}(f_n) = \left(\frac{\lambda_o}{\lambda_n}\right)^2 D_{EUT}(f_o) = \left(\frac{f_n}{f_o}\right)^2 D_{EUT}(f_o),$$

where $D_{EUT}(f_o)$ is directivity of the operating frequency $f_o$, $\lambda_o$ is a wavelength of $f_o$, and $\lambda_n$ is a wavelength of the in-band neighboring frequency $f_n$.

Example 20. The apparatus of any of examples 13 to 19, wherein the base station comprises an active-antenna base station with multiple antennas that can form beams steered to specific directions in a three-dimensional space.

Example 21. The apparatus of any of examples 13 to 20, wherein the computed total radiated power estimates are used to demonstrate conformance to one or more specified in-band unwanted emissions requirements for each of the in-band neighboring frequencies.

Example 22. An apparatus, comprising:
at least one processor; and
at least one memory including computer program code,
the at least one memory and the computer program code configured, with the at least one processor, to cause the apparatus to perform operations comprising:
determining, for a base station that transmits on an operating frequency in part of a frequency band, whether a radiation pattern of each of one or more in-band neighboring frequencies is correlated with a radiation pattern of the operating frequency; and
in response to a determination that the radiation pattern of each of the one or more in-band neighboring frequencies is correlated with that of the operating frequency, computing a total radiated power estimate of each of the one or more in-band neighboring frequencies by performing a beam-based directions procedure for the base station, and outputting the total radiated power estimates of each of the one or more in-band neighboring frequencies.

Example 23. The apparatus of example 22, wherein determining whether a radiation pattern of each of the one or more in-band neighboring frequencies is correlated with that of the operating frequency further comprises determining that a respective characteristic of the radiation pattern of each of the one or more in-band neighboring frequencies and of the radiation pattern of the operating frequency differ by not more than a predetermined amount.

Example 24. The apparatus of example 23, wherein determining that a respective characteristic of the radiation pattern of each of the in-band neighboring frequency and of the radiation pattern of the operating frequency differ by not more than a predetermined amount further comprises determining whether one or more of three correlation test criteria are or are not satisfied.

Example 25. The apparatus of example 24, wherein the three correlation test criteria comprise the following for a given in-band neighbor frequency:
azimuth and elevation half-power angular ratio quantities of the given in-band neighboring frequency radiation pattern match those of the operating frequency;
measured azimuth and elevation half-power beam widths of the given in-band neighboring frequency match those that are derived from half-power beam widths of operating frequency radiation patterns; and
a product of measured azimuth and elevation half-power beam widths and directivity for the given in-band neighboring frequency matches to a directivity-beam width product for the operating frequency.

Example 26. The apparatus of example 25, wherein determining whether a radiation pattern of each of the one or more in-band neighboring frequencies is correlated with that of the operating frequency determines that the radiation pattern of each of the one or more in-band neighboring frequencies is correlated with that of the operating frequency only in response to all three correlation test criteria being satisfied for each of the one or more in-band neighboring frequencies.

Example 27. The apparatus of any of examples 22 to 26, wherein computing a total radiated power estimate of each of the one or more in-band neighboring frequencies by performing the beam-based directions procedure for the base station comprises computing a total radiated power estimate for a neighbor frequency $f_n$ that is calculated from a measured maximum equivalent isotropic radiated power sample measured in a direction of maximum radiation in a main lobe of the radiation pattern of the base station.

Example 28. The apparatus of example 28, wherein the maximum radiation in the main lobe uses directivity $D_{EUT}(f_n)$ determined using the following:

$$D_{EUT}(f_n) = \left(\frac{\lambda_o}{\lambda_n}\right)^2 D_{EUT}(f_o) = \left(\frac{f_n}{f_o}\right)^2 D_{EUT}(f_o),$$

where $D_{EUT}(f_o)$ is directivity of the operating frequency $f_o$, $\lambda_o$ is a wavelength of $f_o$, and $\lambda_n$ is a wavelength of the in-band neighboring frequency $f_n$.

Example 29. The apparatus of any of examples 22 to 28, wherein the base station comprises an active-antenna base station with multiple antennas that can form beams steered to specific directions in a three-dimensional space.

Example 30. The apparatus of any of examples 22 to 29, wherein the computed total radiated power estimates are used to demonstrate conformance to one or more specified in-band unwanted emissions requirements for each of the in-band neighboring frequencies.

Example 31. A computer program product comprising a computer-readable storage medium bearing computer program code embodied therein for use with a computer, the computer program code comprising:
determining, for a base station that transmits on an operating frequency in part of a frequency band, whether a radiation pattern of each of one or more in-band neighboring frequencies is correlated with a radiation pattern of the operating frequency; and
in response to a determination that the radiation pattern of each of the one or more in-band neighboring frequencies is correlated with that of the operating frequency, computing a total radiated power estimate of each of the one or more in-band neighboring frequencies by performing a beam-based directions procedure for the base station, and outputting the total radiated power estimates of each of the one or more in-band neighboring frequencies.

Example 32. The computer program product of claim 31, wherein the computer program code comprises code for performing any of the methods of claims 2 to 9.

As used in this application, the term "circuitry" may refer to one or more or all of the following:
(a) hardware-only circuit implementations (such as implementations in only analog and/or digital circuitry) and
(b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method, comprising:
   determining, for a base station that transmits on an operating frequency, whether a radiation pattern of each of one or more neighboring frequencies is correlated with a radiation pattern of the operating frequency at least by determining that a respective characteristic of the radiation pattern of each of the one or more neighboring frequencies and of the radiation pattern of the operating frequency differ by not more than a predetermined amount based on a set of correlation test criteria comprising the following for a given one of the one or more neighboring frequencies:
   azimuth and elevation half-power angular ratio quantities of the radiation pattern of the given neighboring frequency match those of the operating frequency;
   measured azimuth and elevation half-power beam widths of the given neighboring frequency match those that are derived from half-power beam widths of operating frequency radiation patterns; and
   a product of measured azimuth and elevation half-power beam widths and directivity for the given neighboring frequency matches to a directivity-beam width product for the operating frequency; and
   computing, in response to a determination that the radiation pattern of each of the one or more neighboring frequencies is correlated with that of the operating frequency, a total radiated power estimate of each of the one or more neighboring frequencies by performing a beam-based directions procedure for the base station, and outputting the total radiated power estimates of each of the one or more neighboring frequencies.

2. The method of claim 1, wherein determining whether a radiation pattern of each of the one or more neighboring frequencies is correlated with that of the operating frequency determines that the radiation pattern of each of the one or more neighboring frequencies is correlated with that of the operating frequency only in response to all three correlation test criteria of the set being satisfied for each of the one or more neighboring frequencies.

3. The method of claim 1, wherein computing a total radiated power estimate of each of the one or more neighboring frequencies by performing the beam-based directions procedure for the base station comprises computing a total radiated power estimate for a neighboring frequency $f_n$ that is calculated from a measured maximum equivalent isotropic radiated power sample measured in a direction of maximum radiation in a main lobe of the radiation pattern of the base station.

4. The method of claim 3, wherein the maximum radiation in the main lobe uses directivity $D_{EUT}(f_n)$ determined using the following:

$$D_{EUT}(f_n) = \left(\frac{\lambda_o}{\lambda_n}\right)^2 D_{EUT}(f_o) = \left(\frac{f_n}{f_o}\right)^2 D_{EUT}(f_o)$$

where $D_{EUT}(f_o)$ is directivity of the operating frequency $f_o$, $\lambda_o$ is a wavelength of $f_o$, and $\lambda_n$ is a wavelength of the neighboring frequency $f_n$.

5. The method of claim 1, wherein the base station comprises an active-antenna base station with multiple antennas that can form beams steered to specific directions in a three-dimensional space.

6. The method of claim 1, wherein the computed total radiated power estimates are used to demonstrate conformance to one or more specified in-band unwanted emissions requirements for each of the one or more neighboring frequencies.

7. A non-transitory computer readable medium comprising code for performing the method of claim 1, when the code is run on a computer.

8. The non-transitory computer readable medium according to claim 7, wherein the code is on an internal memory of the computer.

9. An apparatus, comprising:
   at least one processor; and
   at least one memory storing instructions that, when executed by the at least one processor, cause the apparatus at least to perform:
   determining, for a base station that transmits on an operating frequency, whether a radiation pattern of each of one or more neighboring frequencies is correlated with a radiation pattern of the operating frequency at least by determining that a respective characteristic of the radiation pattern of each of the one or more neighboring frequencies and of the radiation pattern of the operating frequency differ by not more than a predetermined amount based on a set of correlation test criteria comprising the following for a given one of the one or more neighboring frequencies:

azimuth and elevation half-power angular ratio quantities of the radiation pattern of the given neighboring frequency match those of the operating frequency;

measured azimuth and elevation half-power beam widths of the given neighboring frequency match those that are derived from half-power beam widths of operating frequency radiation patterns; and a product of measured azimuth and elevation half-power beam widths and directivity for the given neighboring frequency matches to a directivity-beam width product for the operating frequency; and computing, in response to a determination that the radiation pattern of each of the one or more neighboring frequencies is correlated with that of the operating frequency, a total radiated power estimate of each of the one or more neighboring frequencies by performing a beam-based directions procedure for the base station, and outputting the total radiated power estimates of each of the one or more neighboring frequencies.

10. The apparatus of claim 9, wherein determining whether a radiation pattern of each of the one or more neighboring frequencies is correlated with that of the operating frequency determines that the radiation pattern of each of the one or more neighboring frequencies is correlated with that of the operating frequency only in response to all three correlation test criteria of the set being satisfied for each of the one or more neighboring frequencies.

11. The apparatus of claim 9, wherein computing a total radiated power estimate of each of the one or more neighboring frequencies by performing the beam-based directions procedure for the base station comprises computing a total radiated power estimate for a neighboring frequency $f_n$ that is calculated from a measured maximum equivalent isotropic radiated power sample measured in a direction of maximum radiation in a main lobe of the radiation pattern of the base station.

12. The apparatus of claim 11, wherein the maximum radiation in the main lobe uses directivity $D_{EUT}$ (L) determined using the following:

$$D_{EUT}(f_n) = \left(\frac{\lambda_o}{\lambda_n}\right)^2 D_{EUT}(f_o) = \left(\frac{f_n}{f_o}\right)^2 D_{EUT}(f_o)$$

where $D_{EUT}(f_0)$ is directivity of the operating frequency $f_0$, $\lambda_0$ is a wavelength of $f_0$, and $\lambda_n$ is a wavelength of the neighboring frequency $f^n$.

13. The apparatus of claim 9, wherein the base station comprises an active-antenna base station with multiple antennas that can form beams steered to specific directions in a three-dimensional space.

14. The apparatus of claim 9, wherein the computed total radiated power estimates are used to demonstrate conformance to one or more specified in-band unwanted emissions requirements for each of the neighboring frequencies.

15. A computer program product comprising a non-transitory computer-readable storage medium bearing computer program code embodied therein for use with a computer, the computer program code comprising:

determining, for a base station that transmits on an operating frequency, whether a radiation pattern of each of one or more neighboring frequencies is correlated with a radiation pattern of the operating frequency at least by determining that a respective characteristic of the radiation pattern of each of the one or more neighboring frequencies and of the radiation pattern of the operating frequency differ by not more than a predetermined amount based on a set of correlation test criteria comprising the following for a given one of the one or more neighboring frequencies:

azimuth and elevation half-power angular ratio quantities of the radiation pattern of the given neighboring frequency match those of the operating frequency;

measured azimuth and elevation half-power beam widths of the given neighboring frequency match those that are derived from half-power beam widths of operating frequency radiation patterns; and a product of measured azimuth and elevation half-power beam widths and directivity for the given neighboring frequency matches to a directivity-beam width product for the operating frequency; and computing, in response to a determination that the radiation pattern of each of the one or more neighboring frequencies is correlated with that of the operating frequency, a total radiated power estimate of each of the one or more neighboring frequencies by performing a beam-based directions procedure for the base station, and outputting the total radiated power estimates of each of the one or more neighboring frequencies.

16. The computer program product of claim 15, wherein determining whether a radiation pattern of each of the one or more neighboring frequencies is correlated with that of the operating frequency determines that the radiation pattern of each of the one or more neighboring frequencies is correlated with that of the operating frequency only in response to all three correlation test criteria of the set being satisfied for each of the one or more neighboring frequencies.

17. The computer program product of claim 15, wherein computing a total radiated power estimate of each of the one or more neighboring frequencies by performing the beam-based directions procedure for the base station comprises computing a total radiated power estimate for a neighboring frequency $f_n$ that is calculated from a measured maximum equivalent isotropic radiated power sample measured in a direction of maximum radiation in a main lobe of the radiation pattern of the base station.

18. The computer program product of claim 17, wherein the maximum radiation in the main lobe uses directivity $D_{EUT}$ ($f_n$) determined using the following:

$$D_{EUT}(f_n) = \left(\frac{\lambda_o}{\lambda_n}\right)^2 D_{EUT}(f_o) = \left(\frac{f_n}{f_o}\right)^2 D_{EUT}(f_o),$$

where $D_{EUT}(f_0)$ is directivity of the operating frequency $f_0$, $\lambda_0$ is a wavelength of $f_0$, and $\lambda_n$ is a wavelength of the neighboring frequency $f_n$.

19. The computer program product of claim 15, wherein the base station comprises an active-antenna base station with multiple antennas that can form beams steered to specific directions in a three-dimensional space.

* * * * *